Patented May 20, 1941

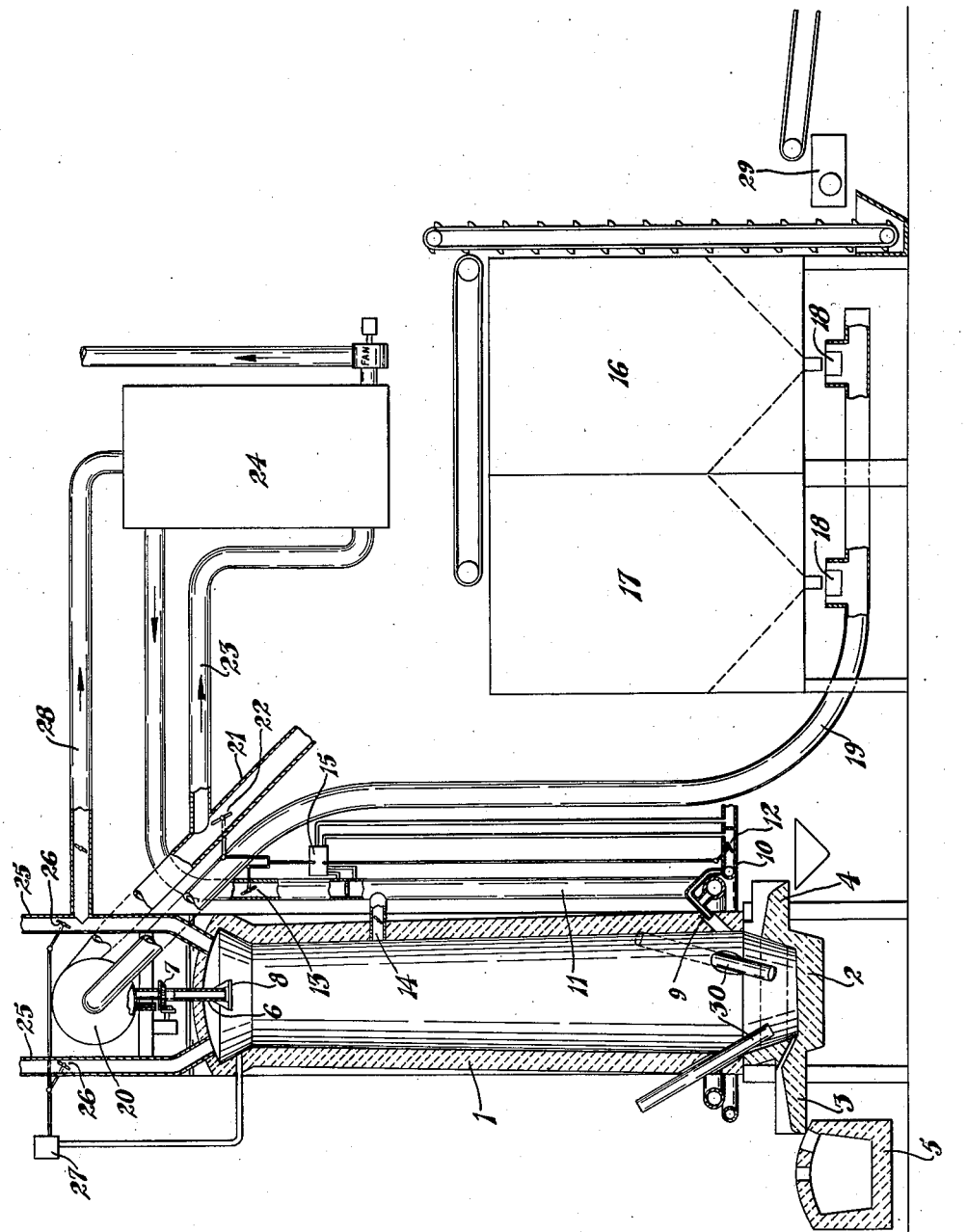

2,242,219

UNITED STATES PATENT OFFICE 2,242,219

PROCESS FOR MELTING AND REFINING FERROUS METALS

Thaddeus F. Baily, Canton, Ohio

Application April 26, 1939, Serial No. 270,110

11 Claims. (Cl. 75—12)

This invention relates to the melting and refining of small particles of ferrous metal such as cast iron borings, light steel chips, sponge iron, and the like by feeding such materials with slag forming materials, into the top of an open shaft type furnace, through which they fall freely, are heated by a current of hot gases formed by the combustion of fuel and air in the lower portion of the shaft, and continue to fall into the hearth of the furnace where they are melted and refined on the hearth, which may be heated by fuel or electricity, or both.

The object of the invention is to provide a process for converting cast iron borings, light chips, and the like into refined metal of desired analysis by charging the metallic particles together with slag forming materials, if required, into the top of a shaft type furnace and allowing them to fall freely through the shaft of the furnace in counterflow to heated gases formed at the bottom of the shaft, and maintaining a slag of uniform composition and temperature upon the hearth of the furnace.

The above objects together with others which will be apparent from the drawing and following description, or which may be later referred to, may be attained as hereinafter described by means of apparatus such as illustrated in the accompanying drawing which is a sectional elevation of a shaft type furnace and the associated material feeding mechanism.

The apparatus includes the shaft type furnace comprising the vertical shaft 1 having the hearth 2 at its lower end, provided with the metal pouring spout 3 and the slag spout 4, so arranged that metal may be continuously poured into the ladle 5 or other receptacle.

For the purpose of feeding the charge at the top of the shaft a hollow shaft 6 is rotatably located through the top of the furnace, arranged to be continuously rotated as by gearing 7, and provided at its lower end with a flat disk 8 adapted to receive the finely divided particles of the charge from the hollow shaft and distribute them uniformly throughout the shaft, so that they may fall freely therethrough.

The shaft of the furnace is open to allow free passage of the materials through it, and is fired with natural or artificial gas, liquid or powdered fuel burned in the lower part of the shaft by means of one or more burners 9, supplied by a pipe 10, together with air, which may be cold or pre-heated as desired, supplied through a pipe 11.

The proportion of fuel and air may be adjusted, by means of valves 12 and 13, respectively, so as to have either an oxidizing condition in the shaft which will oxidize a portion of the borings if this is desirable, or a reducing or non-oxidizing atmosphere may be maintained by limiting the amount of air introduced.

When a non-oxidizing atmosphere is required in the lower part of the shaft it may be advisable to introduce air in the upper part of the shaft, as indicated at 14, for burning the remaining oxidizable constituents of the gas to recover the latent heat value of such gases in the shaft, and such air is admitted at a point in the upper portion of the shaft where the materials are not yet at sufficiently high temperature to be appreciably oxidized.

This secondary air may be either cold or pre-heated, depending on the temperature required at this point.

Electrodes 30 may be provided for producing a higher temperature than is possible with gas or similar fuel.

The shaft not only serves as a pre-heating chamber for the charge, but the limestone is calcined, and any oil, moisture, or organic matter that may be present in the charge is oxidized or volatilized, the oil, if present, serving as part of the fuel for heating the charge.

The temperature and composition of the combustion gases in the shaft of the furnace may be placed under complete control by means of automatic furnace pressure and air and gas ratio control valves of the automatic type operated as by the Askania damper control 15 so that by providing a suitable proportion of fuel and air, the latter at a suitable temperature, there is produced throughout the entire process of heating, melting and refining of the charge, a controlled uniform condition, in direct contrast with the present method of melting and refining wherein the materials are charged into the furnace substantially all at one time and the furnace conditions between charging and tapping are constantly changing.

Bins 16 and 17 may be located adjacent to the furnace for containing limestone and cast iron borings or the like, respectively, for charging in the desired proportions, by means of constant weight feeders 18, to a suction pipe 19 which leads to a fan 20 at the top of the shaft and discharges the materials into the hollow shaft 6.

The air discharge pipe 21 from said fan may lead to a dust collector or the like, and, if desired, may be provided ahead of the automatic damper 22, with a branch pipe 23 leading to a recuperator 24, which may be provided for preheating the air for combustion.

Gases are carried away from the top of the shaft by means of a pipe or pipes 25 which may be provided with dampers 26 operated by an automatic furnace pressure control 27, and if desired, connection may be made as shown at 28 between the pipe 25 and the recuperator.

The raw materials best suited for use in this process are cast iron borings, light steel scrap and the like, or sponge iron. Since much of this scrap material may be too coarse or of a type which may not be readily handled by a feeding mechanism of the type preferred, I provide a suitable crusher or disintegrator 29 which will prepare the material of the charge so that it is of such size and shape as to feed readily. In the case of borings, I desire to crush them so they will pass preferably through a 6 mesh screen, and in the case of steel turnings, to crush them so they will pass through a grating or slot not more than $3/16''$ in width and not longer than $1/2''$.

The materials required for the refining reactions may include iron oxide in the form of mill scale, ore or the like; lime or limestone; silica sand; alumina; and other suitable materials, which may be proportioned and mixed with the borings to be charged, or may be fed separately in the proportions required for the refining reactions and to maintain a suitable slag. The amount and character of these materials required varies with the kind or quality of metal to be produced and the character of the refining reactions.

In carrying out my process, I prepare all the materials of the charge so they may be handled readily by the continuous conveying and proportioning mechanisms, the latter being of the constant weight type, so that the exact weight of raw materials may be used to produce metal and slag of a given analysis.

It is to be noted that by providing positive control of the burden of the furnace and automatic control of the fuel and air for combustion, I maintain constant conditions throughout the process which may be likened to the continuous counterflow method common in chemical industries, in sharp contrast with the present methods of melting and refining iron or steel in fuel fired furnaces using liquid, gaseous or powdered fuel.

It is possible by this new process to change the conditions in the furnace almost instantly by means of varying the proportions of the charge and by varying the air-fuel ratio to change the character of the product. That is to say, that for a certain period of time a given kind of product can be produced uniformly, and then, if another product is desired, the necessary alteration in furnace burden and fuel-air ratio can be made effective in a few minutes since the duration of time for processing the raw materials of the charge to finished product is very short, being a matter of only a few minutes from the time the material leaves the constant weight feeding device and passes through the furnace and refining slag onto the hearth of the furnace and is ready to be tapped as a refined product.

By maintaining a slag of suitable composition and temperature in the hearth of the furnace, the metalloids contained in the metallic charge such as silicon, phosphorus, sulphur, carbon, and the like, also such alloying elements as manganese and chromium, may be removed from the ferrous metal, producing ferrous products of high purity and uniform analysis from raw materials containing various amounts of these impurities. Also, it is possible to remove the various elements selectively to produce different grades of product.

I have found that when charging light cast iron borings with iron oxide and limestone in a furnace of the character described, using natural gas as the fuel and with cold air for combustion, and maintaining a slag consisting substantially of:

| | Per cent |
|---|---|
| $FeO$ | 50 |
| $CaO$ | 30 |
| $SiO_2$ | 20 | if the temperature is kept at about 2400° F., a fluid iron containing above 3% carbon and substantially under .02% in all other constituents can be produced from cast iron borings containing

| | Per cent |
|---|---|
| C | 3.60 |
| Si | 2.20 |
| Mn | .60 |
| S | .08 |
| P | .40 |

While with a similar charge, but with a temperature above 2400° F., but below the melting temperature of steel, a material substantially under .02% carbon, silicon, manganese, sulphur and phosphorus can be produced and removed in a spongy condition having the character of a ball of puddled iron, substantially free from slag which is fluid at the temperature, and I have also found that under the same conditions if electric heat is applied to the hearth so as to raise the temperature of the slag and iron above the melting point, a fluid steel is produced with the carbon, silicon, manganese, sulphur and phosphorus substantially under .02%.

One of the advantages of this new process over other methods of melting and refining cast iron borings and the like in fuel fired furnaces is that the material to be refined or melted is brought substantially to reaction temperature before it reaches the slag and is rapidly refined due to this high temperature and to the fact that the particles are in a finely divided condition when they reach the slag and thus present a large surface compared with their mass to the refining slag.

Another advantage is that since the particles are in a finely divided condition, presenting a large area of surface compared with their mass to the heating gases passing in counterflow to the descending charge in the shaft, a high efficiency of heat transfer results, giving a low fuel consumption compared with any other type of furnace permitting the process to be operated as a continuous process instead of a batch process, providing a continuous supply of refined metal.

At the present time, substantially all of the material of the class mentioned is used in the blast furnace, or as in the case of light alloy steel chips, remelted in electric furnaces without the use of fuel, and the product, as previously mentioned, if melted in the blast furnace, is pig iron containing all of the phosphorus, carbon and other impurities present in the borings charged and must subsequently be refined; and, in the case of the electric furnace, all the volatiles in the form of water or oil present in the charge must be volatilized by electric heat, while all the sulphur that may be present in the oil must be removed by the slag, whereas in my new process, the volatile part of the materials of the charge including most of the sulphur from the oil on the chips is oxidized or volatilized by fuel while the material is freely falling through the shaft, and these volatiles are carried out by the gases from the combustion of the fuel and do not reach the hearth of the furnace. Any carbon remaining from the volatilization of oil and deposited on the chips while freely falling through the shaft, is subsequently oxidized, and prevented from reaching the hearth and the heat of the oxidation of this residual carbon is utilized in heating the charge as it falls through the shaft.

I have also found that in charging cast iron borings of the analysis mentioned above, without charging any iron oxide, and using a lime-silicate slag of the character for the removal of sulphur and with a non-oxidizing flame in the shaft for heating and melting the material, a high grade foundry iron may be produced, low in sulphur, and retaining the carbon, silicon, manganese, and phosphorus, and if carbon is charged onto the hearth of the furnace, not only all of the carbon that was present in the charge may be retained, but the carbon in the metal may be built up to 4.00% or more, thus producing a foundry iron of substantially the same analysis as the charge excepting that the sulphur, which is an undesirable constituent in foundry iron, is reduced to under .02%.

In several actual tests of the process different desired analyses of metal were obtained from the same metal charge. In each case cast iron borings were used containing:

| | Per cent |
|---|---|
| C | 3.60 |
| Si | 2.20 |
| Mn | 60 |
| S | .07 |
| P | .40 | with a slag containing approximately

| | Per cent |
|---|---|
| FeO | 50 |
| CaO | 30 |
| SiO₂ | 20 |

By maintaining the temperature of the slag at approximately 2600° F., puddled iron was produced, which, due to the low carbon content was not fused and was removed from the furnace as a pasty, spongy mass, substantially free from the slag and of the following analysis:

| | |
|---|---|
| C | .04 |
| Si | .02 |
| Mn | .02 |
| S | .016 |
| P | .024 |

Using the same analysis of metal charge and slag, but bringing the temperature of the slag and metal to about 3000° F., both the slag and metal were fluid and were poured from the furnace, the metal being a low carbon steel of the following analysis:

| | |
|---|---|
| C | .03 |
| Si | .05 |
| Mn | .02 |
| S | .035 |
| P | .015 |

Using the same analysis of metal charge and slag and maintaining the temperature not over 2400° F., washed metal was produced of the following analysis:

| | |
|---|---|
| C | 3.38 |
| Si | .10 |
| Mn | .03 |
| S | .055 |
| P | .049 |

Foundry iron was produced by the same process using a metal charge of the same analysis and a slag consisting substantially of:

| | Per cent |
|---|---|
| CaO | 56 |
| SiO₂ | 22 |
| FeO | 22 | coarse carbon was maintained on the hearth for reducing the iron oxide in the slag and for increasing the carbon content in the metal. The finished product had an analysis of:

| | |
|---|---|
| C | 3.99 |
| Si | .76 |
| Mn | .56 |
| S | .024 |
| P | .29 |

If it is desired to retain all of the Si, Mn and P, and other constituents such as C, and any oxidizable alloys in the charge then I prefer to use a slag high in lime and containing no iron oxide, which may be substantially:

| | Per cent |
|---|---|
| CaO | 45 |
| SiO₂ | 35 |
| MgO | 15 |
| Al₂O₃ | 5 |

The above slag may be used or any composition of slag of a character suitable for removal of sulphur.

Another outstanding advantage of this process is that due to the continuous feeding and extremely rapid refining, there is always available for casting or subsequent processing, fluid metal which may be drawn continuously from the furnace at all times, in contrast with other types of furnaces such as the electric furnace or the open hearth furnace which must be operated as batch furnaces, and during the melting and refining time, do not have available finished metal for processing. It should be noted, therefore, that this process is adapted for continuous operation whereas an open hearth, for instance, must tap the entire charge at one time, which requires large ladle, crane and other equipment to take care of the large quantities of metal that must be handled in a very short space of time, producing an uneven flow of material in the subsequent operations incident to processing the metal to finished product.

In operating my process where an oxidizing slag may be required for refining the metal, instead of charging iron oxide in the form of mill scale, ore, or another ferrous oxide, in some cases I maintain an oxidizing atmosphere in the shaft of the furnace, which may be automatically controlled so as to oxidize a portion of the metallic charge to produce a part or all of the iron oxide required for refining and to maintain the desired slag. This method not only provides the necessary iron oxide for the refining reactions and the iron oxide constituent of the slag, but the oxidation of such iron furnishes a considerable quantity of heat, which when producing low carbon steel from cast iron borings, may be as much as half of the total heat required in the shaft of the furnace.

When making low carbon steel from cast iron borings, the oxidation reactions in the hearth of the furnace for removing the silicon, manganese, and phosphorus from the borings by the iron oxide produced by the oxidation of a portion of the borings in the shaft as mentioned above, or charged as ore, mill scale, or the like, return a considerable portion of the Fe in the FeO to the refined metal as metallic iron, and do this with a considerable evolution of heat.

In the case where it is desired to produce low sulphur metal from cast iron borings without the loss of carbon, silicon, manganese, or phosphorus, I prefer to use pre-heated air for the blast and operate the shaft of the furnace under an atmosphere non-oxidizing to iron, and use a slag substantially free from iron oxide, but high in lime and with only enough silica or other constituents to form a fluid slag of such character as to remove the sulphur from the metal.

In order to have good fuel efficiency and the necessary reducing or non-oxidizing condition in the lower part of the shaft, pre-heated air may be advantageously provided by means of a recuperator whereby the air is pre-heated from the waste gases removed at the top of the furnace and conducted to such a recuperator for the purposes mentioned.

Under some conditions of operation where it is desirable to produce metal high in carbon and low in all other constituents, it may be necessary, due to the exothermic reactions in the hearth of the furnace, to charge cold material of such character that it will enter the slag without material pre-heating so as to maintain a temperature in the hearth low enough to prevent the oxidation of the carbon. The oxidation of silicon, manganese, and phosphorus otherwise might raise the temperature sufficiently high for the oxidizing slag to attack the carbon in the metal.

By my new method, particularly when electricity is used for superheating the charge in the hearth of the furnace, I am able to economically melt light steel turnings producing fluid steel, pre-heating them as they fall through the shaft, preferably using a non-oxidizing atmosphere to prevent oxidation unless the particles of the charge contain silicon or phosphorus which it is desired to remove, in which case, I charge either iron oxide or ore, or oxidize a portion of the steel chips to obtain the necessary iron oxide for the oxidizing refining slag as in the case of cast iron borings.

I have also found that when charging steel scrap containing chromium, nickel, and molybdenum with the conditions as outlined above, substantially all of these materials in the charge are recovered in the metal as alloy pig iron or, if carbon is not included in the charge, as alloy steel.

I have also found that when charging cast iron borings containing chromium, nickel, and molybdenum, as well as phosphorus and sulphur, I am able to produce metal not only low in carbon, silicon, manganese, phosphorus, and sulphur, but also to eliminate substantially all of the chromium while recovering the nickel and molybdenum. This is advantageous in the production of nickel or nickel-molybdenum iron or steel free from chromium. It is thus to be noted that by my new process, I am able to produce pig iron of high quality or steel of high quality from a class of scrap material that cannot economically be processed directly to either iron or steel without first going through the conventional blast furnace where it is converted to pig iron of relatively low quality which must subsequently be refined in the open hearth or electric furnace.

It may here be noted that when alloy borings or turnings are charged into the blast furnace where no control is had over the alloys contained therein and are utilized by the blast furnace simply because of their low cost compared with ore, a product is produced containing alloys undesirable for the production of high grade iron castings or steel, and it may here be cited that when light scrap steel containing chromium is charged into the blast furnace, substantially all the chromium appears in the metal making it, if above .02% in this element, prohibitive for use in some operations, for instance, in the production of malleable castings.

This new process for melting is also particularly well adapted to the melting of sponge iron which has been reduced to the metallic state from ore without fusion and is in a finely divided condition, and this finely divided sponge iron may be processed to molten steel without oxidation much in the same manner as reference has already been made to the melting of light steel chips without oxidation, or the sponge iron may be melted and carburized to produce pig iron.

This process is also well adapted to the production of alloy steels such as, for instance, 18% chromium steel made from cast iron borings, steep chips, or sponge iron, and chrome ore, in which case I add to the metallic charge chrome ore and carbon, which reacts on the hearth producing the desired amount of metallic chromium and maintaining a suitable slag for such an operation. By this method I am able to produce low carbon chromium steel of the desired analysis. It is to be noted that the chromium may be charged in the form of ferrochrome, and a suitable slag maintained to produce low carbon chromium steel.

Similarly nickel, molybdenum, or other alloys may be added to the purified iron either in the form of reduced metal, or a reducible oxide with the required reducing agent.

This process is also adapted for the production of ferro-alloys such as ferro-silicon from borings or chips and the ore or oxide of the alloying element. For instance, for the production of 50% ferro-silicon, I add sand and carbon to the metallic charge, reducing the desired amount of silicon with electric heat on the hearth, and utilizing the CO gas formed in the silicon reduction reaction on the hearth for pre-heating the charge in the shaft.

I also produce synthetic pig iron from low carbon steel chips by adding coarse carbon and silica or other reducible oxides required, to the metallic charge to make pig iron of the desired chemical analysis. In this case, the low carbon chips, as well as the carbon and oxides charged, are brought to a high temperature by fuel in the shaft of the furnace, and the electricity required is only that required for the reduction of the silicon, manganese or other elements to be reduced from the oxide form. The carbon charged is all used either for the reduction of the oxides or for the carbon content in the metal, this process requiring no residual column of electrically heated carbon as in my process covered by Patent No. 1,821,783.

It is thus to be noted that I have combined in my process a method of pre-heating the charge by fuel under controlled conditions, and a method of rapidly refining by fuel or electricity, and in the case of ferrous alloy production and the like, a method of pre-heating the charge by fuel and performing the reduction reactions with electric heat.

In this method I am able to maintain all the steps of the process under constant conditions and, due to the finely divided condition of the materials of the charge and the principle of counterflow throughout the steps of heating and refining, I am able to get extremely fast reactions as compared with any existing process for producing iron or steel.

When it is desired to produce alloy steels the process may be carried out as above described and the proper quantities of the desired ferro-alloys are added to the molten metal on the hearth or in the ladle, or may be added to the charge.

I claim:

1. That method in converting light ferrous metal particles into refined metal which consists in charging the metallic particles with materials which will form an iron refining slag, into the top of a shaft type furnace fired with fuel and air introduced at the bottom of the shaft, heating the material to melting temperature as it falls through the furnace in counterflow to the heating gases, collecting the metal and slag in the hearth of the furnace, and removing the gases at the top of the furnace.

2. That method of melting finely divided ferrous metallic particles which consists in continuously charging at a uniform rate into the top of a shaft type furnace particles to be melted and refined together with the proper quantity of materials which will form an iron refining slag, allowing them to fall freely through the shaft of the furnace in counterflow to heated gases formed at the bottom of the shaft by the combustion of fuel and air, maintaining uniform temperatures and gas compositions at the various levels in the open shaft, and a uniform slag composition and temperature in the slag, and a uniform temperature in the refined metal.

3. The process of refining light cast iron borings which consists in charging such material with material which will form an iron refining slag into the top of a shaft type furnace and permitting the material to fall freely through the furnace, heating the material to substantially reaction temperature between slag and metal while falling through the furnace, refining the heated material while passing through molten slag at the hearth of the furnace, collecting the refined metal in the hearth below the slag, and removing the furnace gases at the top of the furnace.

4. The process of refining light cast iron borings which consists in charging such material with material which will form an iron refining slag into the top of a shaft type furnace and permitting the material to fall freely through the furnace, heating the material to substantially reaction temperature between slag and metal while falling through the furnace, refining the heated material while passing through molten slag in the hearth of the furnace, maintaining the slag at the desired temperature by the heat of combustion of fuel, collecting the refined metal in the hearth below the slag, and removing the furnace gases at the top of the furnace.

5. The process of refining light cast iron borings which consists in charging such material with material which will form an iron refining slag into the top of a shaft type furnace and permitting the material to fall freely through the furnace, heating the material to substantially reaction temperature between slag and metal while falling through the furnace, refining the heated material while passing through molten slag in the hearth of the furnace, maintaining the slag at the desired temperature by electric heat, collecting the refined metal in the hearth below the slag, and removing the furnace gases at the top of the furnace.

6. The process of producing alloy steels from finely divided ferrous material which consists in charging such material with material which will form an iron refining slag, oxides of the alloying elements, and carbon for reduction, into the top of a shaft type furnace, heating the material as it falls through the furnace in counterflow to the heating gases, reducing the desired metallic oxides in the hearth of the furnace with carbon, collecting the metal and slag in the hearth of the furnace, and removing the gases at the top of the furnace.

7. The process of producing alloy steel from light ferrous metal turnings which consists in charging the metallic particles and materials which will form an iron refining slag into the top of a shaft type furnace fired with fuel and air introduced at the bottom of the shaft, heating the material as it falls through the furnace in counterflow to the heating gases, adding ferro-alloys to the fluid steel, collecting the alloy steel and slag in the hearth of the furnace, and removing the gases at the top of the furnace.

8. That method in converting light ferrous metal particles into refined metal which consists in continuously charging the metallic particles into the top of a shaft type furnace fired with fuel and air introduced at the bottom of the shaft, heating the material to substantially melting temperature as it falls freely through the furnace in counterflow to the heating gases, maintaining a refining slag of uniform composition and temperature in the hearth of the furnace, melting or superheating the heated metal as it passes through the slag, removing the metal and slag from the hearth, and removing the gases at the top of the furnace.

9. That method in converting light ferrous metal particles into refined metal which consists in continuously charging light ferrous metal particles and materials which will form an iron refining slag to perform the refining reaction into the top of a shaft type furnace, fired with fuel and air introduced at the bottom of the shaft, allowing them to fall freely in counterflow to the heating gases, maintaining a refining slag of uniform composition and temperature for refining the molten metal particles as they pass through the slag, continuously removing the refined metal from the bottom of the hearth and the surplus slag from the top of the slag bath, and removing the gases at the top of the furnace.

10. That method in melting and refining cast iron borings which consists in charging the metallic particles with materials which will form an iron refining slag into the top of an open shaft type furnace fired with fuel and air introduced at the bottom of the shaft, heating and melting the particles of metal while they are falling through the shaft, introducing the particles of the charge into the molten refining slag while they are still separated from each other, refining the particles of metal while they are passing through the slag, and collecting the molten refined metal in the hearth of the furnace.

11. The method of melting and refining cast iron borings which consists in charging such material with material which will form an iron refining slag into the top of a shaft type furnace and permitting the materials to fall freely through the furnace, heating and melting the particles of metal while they are falling freely through the furnace in counter-flow to gases of combustion introduced at the bottom of the furnace shaft, introducing the particles of the charge into the molten refining slag while still separated from each other, refining the particles of metal while they are passing through the slag and then collecting the molten refined metal in the hearth of the furnace, the slag-forming materials being charged simultaneously with the metal so that there is intimate contact between the molten metal and the hot particles of the slag-forming materials as soon as these materials strike the slag bath.

THADDEUS F. BAILY.